(12) United States Patent
Niddam et al.

(10) Patent No.: US 6,891,814 B2
(45) Date of Patent: May 10, 2005

(54) MF-TDMA TELECOMMUNICATION SYSTEM AND A TERMINAL THEREFOR

(75) Inventors: David Niddam, Toulouse (FR); Stéphane Pirio, Rueil-Malmaison (FR)

(73) Assignee: Alcatel, Paris (FR)

( * ) Notice: Subject to any disclaimer, the term of this patent is extended or adjusted under 35 U.S.C. 154(b) by 553 days.

(21) Appl. No.: 10/141,877

(22) Filed: May 10, 2002

(65) Prior Publication Data

US 2002/0176397 A1 Nov. 28, 2002

(30) Foreign Application Priority Data

May 22, 2001  (FR) .............................................. 01 06722

(51) Int. Cl.[7] .......................... H04Q 7/00; H04B 7/204; H04B 7/212
(52) U.S. Cl. ........................ 370/330; 370/319; 370/321
(58) Field of Search ................. 370/321, 337, 370/344, 319, 330, 328, 316

(56) References Cited

U.S. PATENT DOCUMENTS 5,073,900 A   12/1991  Mallinckrodt
5,812,545 A * 9/1998  Liebowitz et al. .......... 370/337
6,160,994 A * 12/2000 Wiedeman .................. 455/12.1

FOREIGN PATENT DOCUMENTS

DE      197 04 907 A1    7/1997
DE      199 19 513 A1    11/2000

* cited by examiner

*Primary Examiner*—Duc Ho
(74) *Attorney, Agent, or Firm*—Sughrue Mion, PLLC

(57) ABSTRACT

A multiple frequency time division multiple access digital telecommunication system, in particular a transparent satellite telecommunication system, includes terminals and a base station. Calls can be effected in star mode, via the base station, or in meshed mode, directly between the terminals, which are divided into two groups. The frequency band allocated to the system is divided into two parts, comprising a first part for sending by the first group and a second part for sending by the second group. Each part of the frequency band is divided into two sub-bands. The central sub-bands are used for meshed sending, the end sub-bands are used for star sending, and the two central sub-bands are also used for meshed reception by both groups of terminals.

10 Claims, 1 Drawing Sheet

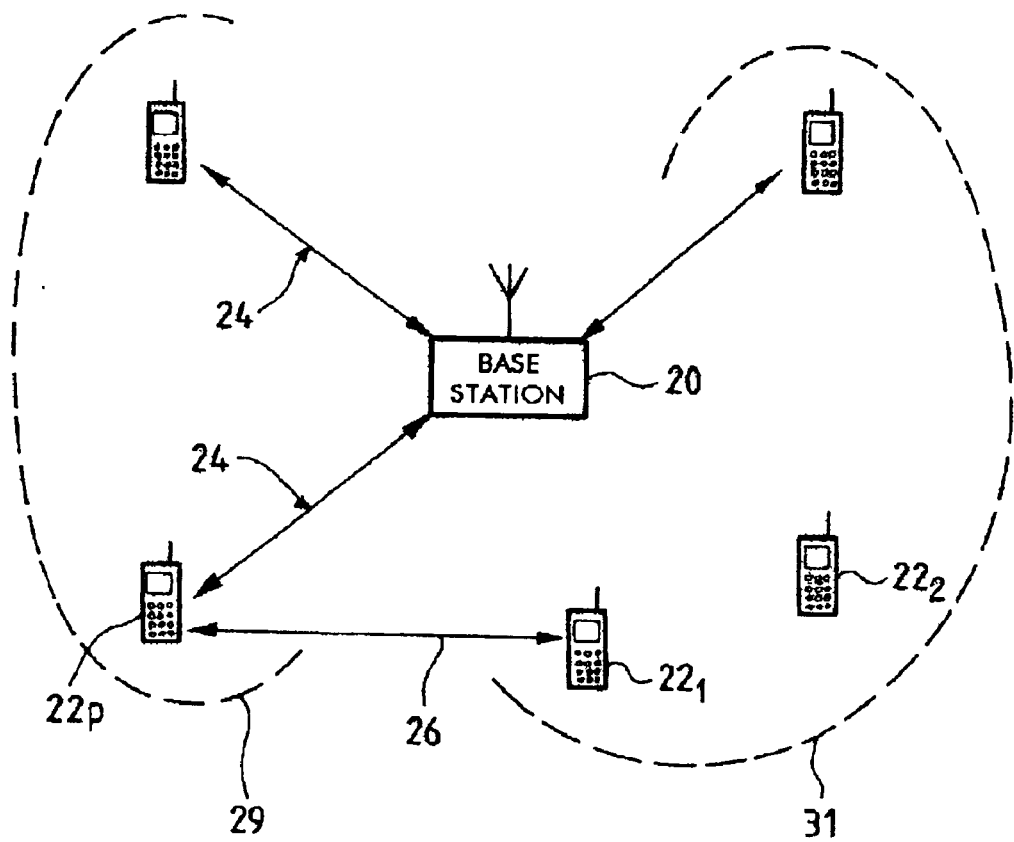
FIG_1
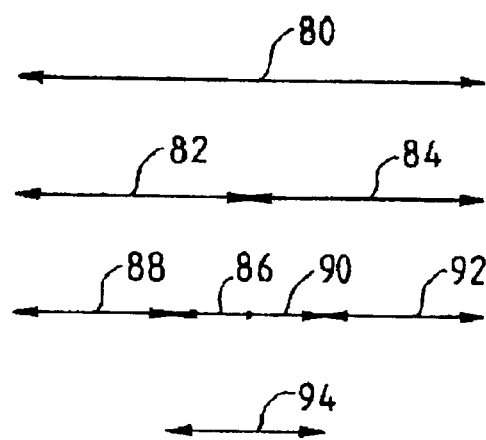
FIG_2

MF-TDMA TELECOMMUNICATION SYSTEM AND A TERMINAL THEREFOR

CROSS-REFERENCE TO RELATED APPLICATIONS

This application is based on French Patent Application No. 01 06 722 filed May 22, 2001, the disclosure of which is hereby incorporated by reference thereto in its entirety, and the priority of which is hereby claimed under 35 U.S.C. §119.

BACKGROUND OF THE INVENTION

1. Field of the Invention

The invention relates to a telecommunication system, in particular a transparent satellite telecommunication system.

2. Description of the Prior Art

It is known in the art that diverse types of communication resources, in particular frequencies, time slots and codes, can be used to transmit a multiplicity of digital calls simultaneously.

Multiple frequency time division multiple access (MF-TDMA) transmission, which uses a multiplicity of frequencies and time slots simultaneously, provides a high data bit rate. This is why it is used in the DVB-RCS standard, currently in preparation, which concerns the transmission via satellite of digital data (audio, video, Internet, etc.).

In the above type of telecommunication system, each carrier, which has a particular frequency, offers a given number of time slots per frame, the number of time slots per frame being equal to 1 or to a power of 2, for example.

Messages are transmitted in superframes containing a particular number of frames. A frame, which comprises a particular number of carriers and time slots, is transmitted during a particular time and a superframe extends over a number N of frame durations and includes a number $N_1$ of carriers.

During a frame, the same message may be transmitted on several different types of carrier, that is to say with time slots of different duration.

As a general rule, MF-TDMA calls can be "star" calls, i.e. calls made through the intermediary of a base station. In other words, a terminal communicates with another terminal via the base station. It is also possible to effect calls directly between terminals, without passing through the base station, and this type of call is called a "meshed" call. It is also possible to combine star calls and meshed calls.

It has been found that in the above type of telecommunication system the frequency hops for the same terminal can have large values, which makes the implementation of the terminals of the above kind of telecommunication system relatively complex.

An object of the invention is to enable total (star and meshed connection) connectivity using terminals having limited performance in terms of send and receive frequency hopping and using the MF-TDMA technique to send and receive.

The invention therefore calls for terminals equipped with an MF-TDMA modulator for star sending (to a base station) or meshed sending (to other terminals) and an MF-TDMA demodulator for meshed reception (from other terminals).

The frequency band allocated to the system is divided into two parts and the terminals are divided into two groups; the first group can send in the first part of the frequency band and the second group can send in the second part of the frequency band; each part of the frequency band is divided into two sub-bands, of which one is for star sending and the other is for meshed sending, the sub-bands for meshed sending being adjacent and the combination of the two sub-bands for meshed sending also being used for meshed receiving.

Accordingly, in each group of terminals, the send frequency hops are limited to the part of the band allocated to that group and the receive frequency hops are limited to the two adjacent central sub-bands.

The two parts of the band are preferably equal. Similarly, it is preferable if the central sub-bands allocated to meshed reception are both the same width.

However, the two sub-bands of each part can be unequal. For example, the width of the sub-band allocated to star sending can be significantly greater than the width of the sub-band allocated to meshed sending.

In one embodiment, the width of the combination of the two central sub-bands is less than the width of each of the sub-bands allocated to star sending.

As a general rule, the system's total star and meshed send band corresponds to at least twice the send band of a terminal and the total meshed receive band corresponds to the receive band of a terminal.

The invention relates not only to the telecommunication system as a whole, but also to its various component parts, in particular a base station and each of the terminals including an MF-TDMA modulator and an MF-TDMA demodulator.

SUMMARY OF THE INVENTION

The invention provides a multiple frequency time division multiple access digital telecommunication system, in particular a transparent satellite telecommunication system, including a plurality of terminals and a base station, wherein calls can be effected in star mode, via the base station, or in meshed mode, directly between the terminals, which are divided into two groups, the frequency band allocated to the system is divided into two parts, comprising a first part for sending by the first group and a second part for sending by the second group, each part of the frequency band is divided into two sub-bands, the central sub-bands are used for meshed sending, the end sub-bands are used for star sending, and the two central sub-bands are also used for meshed reception by both groups of terminals.

In one embodiment the two parts of the band are equal.

The two sub-bands of one part of the band can have unequal widths.

In this case, the width of the meshed receive sub-band is less than the width of the star send sub-band.

Given the above hypothesis, the width of the combination of the two central sub-bands is less than the width of the smaller of the end bands.

The invention also provides a terminal for use in a multiple frequency time division multiple access digital telecommunication system in which each terminal can communicate with other terminals either in meshed mode, directly from terminal to terminal, or in star mode, via a base station, and a frequency band divided into two separate parts is allocated to the system, which terminal includes means for sending in one of the two parts of the frequency band, the one part being divided into two sub-bands, one of which, that closest to the other part, is for meshed sending and the other of which is for star sending, and means for meshed receiving in the meshed send sub-band and the adjacent sub-band, which is allocated to meshed sending in the second part of the band.

Other features and advantages of the invention will become apparent from the description of embodiments of the invention given with reference to the accompanying drawings.

BRIEF DESCRIPTION OF THE DRAWINGS

FIG. 1 is a diagram of an MF-TDMA telecommunication system that can operate in star mode and in meshed mode using a transparent satellite.

FIG. 2 is a diagram showing the use in accordance with the invention of the frequency band allocated to the system shown in FIG. 1.

DETAILED DESCRIPTION OF THE PREFERRED EMBODIMENT

FIG. 1 shows one embodiment of a telecommunication system according to the invention. In this embodiment, all calls are effected via a satellite (not shown), in particular a geosynchronous satellite which is transparent (i.e. which forms a simple relay station), the territory covered by the satellite is divided into zones, and each zone is assigned a base station 20. In each zone there is a plurality of terminals, the number of which can be very large, for example of the order of a hundred thousand.

In this telecommunication system, in accordance with the invention, the terminals $21_1, 22_2 \ldots 22_p$ communicate in star mode, i.e. via the base station 20, as shown by the double-headed arrows 24, or directly from terminal to terminal, as shown by the double-headed arrow 26 between the terminals $22_1$ and $22_p$.

These calls are MF-TDMA calls. However, calls from the station 20 to the terminals can be effected in a different mode.

The distribution of the frequencies allocated to the telecommunication system in accordance with the invention shown here is such that the terminals have limited receive and send frequency agility, whilst allowing all possible meshed and star connections between terminals.

Limited agility means that a terminal can hop from one frequency to another only within a limited range, which can be different for receiving and sending. For example, the frequency hopping capacity is 20 MHz for receiving and 50 MHz for sending.

In the example shown in FIG. 2, the frequency band allocated to the terminals is represented by the line 80 and the width of this band is 100 MHz.

The 100 MHz frequency band 80 is divided into two equal parts in this example, each part corresponding to a respective group of terminals 29, 31.

For sending, the first group of terminals uses the lower half-band 82 and the second group 31 of terminals uses the upper half-band 84, each of these half-bands having a width of 50 MHz.

There are two unequal parts in each of the two send half-bands 82 and 84. Accordingly, the half-band 82 includes a sub-band 86 having a width of 10 MHz for meshed sending, which corresponds to the highest values of the half-band 82, and a sub-band 88 having a width of 40 MHz for star sending. Similarly, the half-band 84 includes two unequal sub-bands, namely a sub-band 90, also having a width of 10 MHz, corresponding to the lowest values of the half-band 84, and a sub-band 92 having a width of 40 MHz.

The sub-bands 86 and 90, which together form a band having a width of 20 MHz, are used for meshed sending from terminal to terminal, whereas the sub-bands 88 and 92 are used for star sending from terminals to the central station.

Finally, the set 94 of two contiguous central sub-bands 86 and 90 is allocated to meshed reception, forming a 20 MHz band.

It can be seen that this complies with the send frequency agility constraints since, for each group of terminals, the send frequency band is 50 MHz wide and the meshed receive band is 20 MHz wide.

For example, a terminal of the first group can send in meshed mode or in star mode and comply with the agility constraint limit of 50 MHz because in this first group the half-band 82 is 50 MHz wide. Similarly, for the second group, the width of the half-band 84 is limited to 50 MHz.

For meshed calls, a terminal of the first group can send to any terminal of the first or second group, since its 10 MHz send band is within the 20 MHz meshed receive sub-band 94. In other words, a send frequency chosen in the band 86 is in the meshed receive band 94 of all the terminals.

For star calls, a terminal of the first group can then send to the base station on a bandwidth of 40 MHz. This applies equally to a terminal of the other group. Thus the terminals of the two groups offer a bandwidth of 80 MHz for sending to the base station.

Although it is preferable for the width of the central sub-bands 86 and 90 to be equal, they can have unequal widths. In this case, the end sub-bands 88 and 92 can also have unequal widths.

Also, the numbers of terminals in the first and second groups can vary and can be equal or different.

There is claimed:

1. A multiple frequency time division multiple access digital telecommunication system, in particular a transparent satellite telecommunication system, including a plurality of terminals and a base station, wherein calls can be effected in star mode, via the base station, or in meshed mode, directly between the terminals, which are divided into two groups, the frequency band allocated to the system is divided into two parts, comprising a first part for sending by the first group and a second part for sending by the second group, each part of the frequency band is divided into two sub-bands, the central sub-bands are used for meshed sending, the end sub-bands are used for star sending, and the two central sub-bands are also used for meshed reception by both groups of terminals.

2. The system claimed in claim 1 wherein the two parts of the band are equal.

3. The system claimed in claim 1 wherein the two sub-bands of one part of the band have unequal widths.

4. The system claimed in claim 3 wherein the width of the meshed receive sub-band is less than the width of the star send sub-band.

5. The system claimed in claim 4 wherein the width of the combination of the two central sub-bands is less than the width of the smaller of the end bands.

6. A terminal for use in a multiple frequency time division multiple access digital telecommunication system in which each terminal can communicate with other terminals either in meshed mode, directly from terminal to terminal, or in star mode, via a base station, and a frequency band divided into two separate parts is allocated to the system, which terminal includes means for sending in one of the two parts of the frequency band, the one part being divided into two sub-bands, one of which, that closest to the other part, is for meshed sending and the other of which is for star sending, and means for meshed receiving in the meshed send sub-band and the adjacent sub-band, which is allocated to meshed sending in the second part of the band.

7. The terminal claimed in claim 6 wherein said two parts of said band are equal.

8. The terminal claimed in claim 6 wherein said two sub-bands are unequal.

9. The terminal claimed in claim 8 wherein the width of said meshed send sub-band is less than the width of said star send sub-band.

10. The terminal claimed in claim 6 wherein the width of said meshed receive band is less than the width of said star send band.

* * * * *